(12) United States Patent
Sung

(10) Patent No.: US 7,000,843 B2
(45) Date of Patent: Feb. 21, 2006

(54) LUMINESCENT CARD DEVICE

(75) Inventor: Chih-Hung Sung, Shulin (TW)

(73) Assignee: King House Technology Co., Ltd., Taipei (TW)

(*) Notice: Subject to any disclaimer, the term of this patent is extended or adjusted under 35 U.S.C. 154(b) by 0 days.

(21) Appl. No.: 11/017,818

(22) Filed: Dec. 22, 2004

(65) Prior Publication Data

US 2005/0167688 A1    Aug. 4, 2005

(30) Foreign Application Priority Data

Jan. 30, 2004  (TW) .............................. 93201378 U

(51) Int. Cl.
*G06K 7/00* (2006.01)
*G06K 19/06* (2006.01)
(52) U.S. Cl. ..................................... 235/486; 235/488
(58) Field of Classification Search ................ 235/486, 235/437, 491, 488, 468, 441, 493; 435/287.2, 435/183, 6
See application file for complete search history.

(56) References Cited

U.S. PATENT DOCUMENTS

| 3,976,857 | A | * | 8/1976 | Hogberg et al. ............. 235/437 |
| 5,818,500 | A | * | 10/1998 | Edwards et al. ............ 347/238 |
| 6,448,064 | B1 | * | 9/2002 | Vo-Dinh et al. .......... 435/287.2 |
| 2004/0020993 | A1 | * | 2/2004 | Green ......................... 235/491 |
| 2005/0035705 | A1 | * | 2/2005 | Haas .......................... 313/503 |

* cited by examiner

*Primary Examiner*—Thien M. Le
(74) *Attorney, Agent, or Firm*—Troxell Law Office, PLLC

(57) ABSTRACT

A luminescent card device has a luminescent card and an actuator. The luminescent card has a plastic layer, a luminescent layer, a memory device and multiple printed layers. The actuator is mounted on a corner of the luminescent card and selectively transforms direct current into alternating current that drives a capacitor embedded in the luminescent layer to excite the luminescent layer and make it emit light. Only a few specific manufacturers make the luminescent layer so if criminals try to counterfeit any luminescent card device, law enforcement agents are able to trace the criminals through the luminescent layer's manufacturers. The issuing banks and card companies do not lose money from any counterfeit cards.

5 Claims, 5 Drawing Sheets

LUMINESCENT CARD DEVICE

BACKGROUND OF THE INVENTION

1. Field of the Invention

The present invention relates to a card, and more particularly to a luminescent card device that emits light and is very difficult to counterfeit.

2. Description of Related Art

Cards such as credit cards, debit cards, cash cards and the like are widely used by consumers. Cards allow consumers to make purchases without carrying cash, withdraw finds from accounts, take out preapproved loans and the like.

Because such cards are so conventional and frequently used, some criminals make counterfeit cards to make illegal profits. Counterfeiting cards is not very difficult. Materials and equipment to counterfeit cards are relatively easy to obtain. Because the origin of counterfeit cards is very difficult to trace, criminals judiciously using and selling the counterfeit cards often get away without being caught. The banks and the card companies suffer tremendous loses from these counterfeit cards.

To overcome the shortcomings, the present invention provides a luminescent card device to obviate or mitigate the aforementioned problems.

SUMMARY OF THE INVENTION

The primary objective of the present invention is to provide a luminescent card device that can emit light and is very difficult to counterfeit The luminescent card device has a luminescent card and an actuator. The luminescent card comprises a plastic layer, a luminescent layer, a memory device and multiple printed layers. The actuator is mounted on a corner of the luminescent card and selectively transforms direct current to alternating current that drives a capacitor embedded in the luminescent layer to excite the luminescent layer and make it emit light. Only a few specific manufacturers make the luminescent layer so if criminals try to counterfeit any luminescent card device, law enforcement agents are able to trace the criminals through the luminescent layer's manufacturers. The issuing banks and card companies do not lose money from any counterfeit cards.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
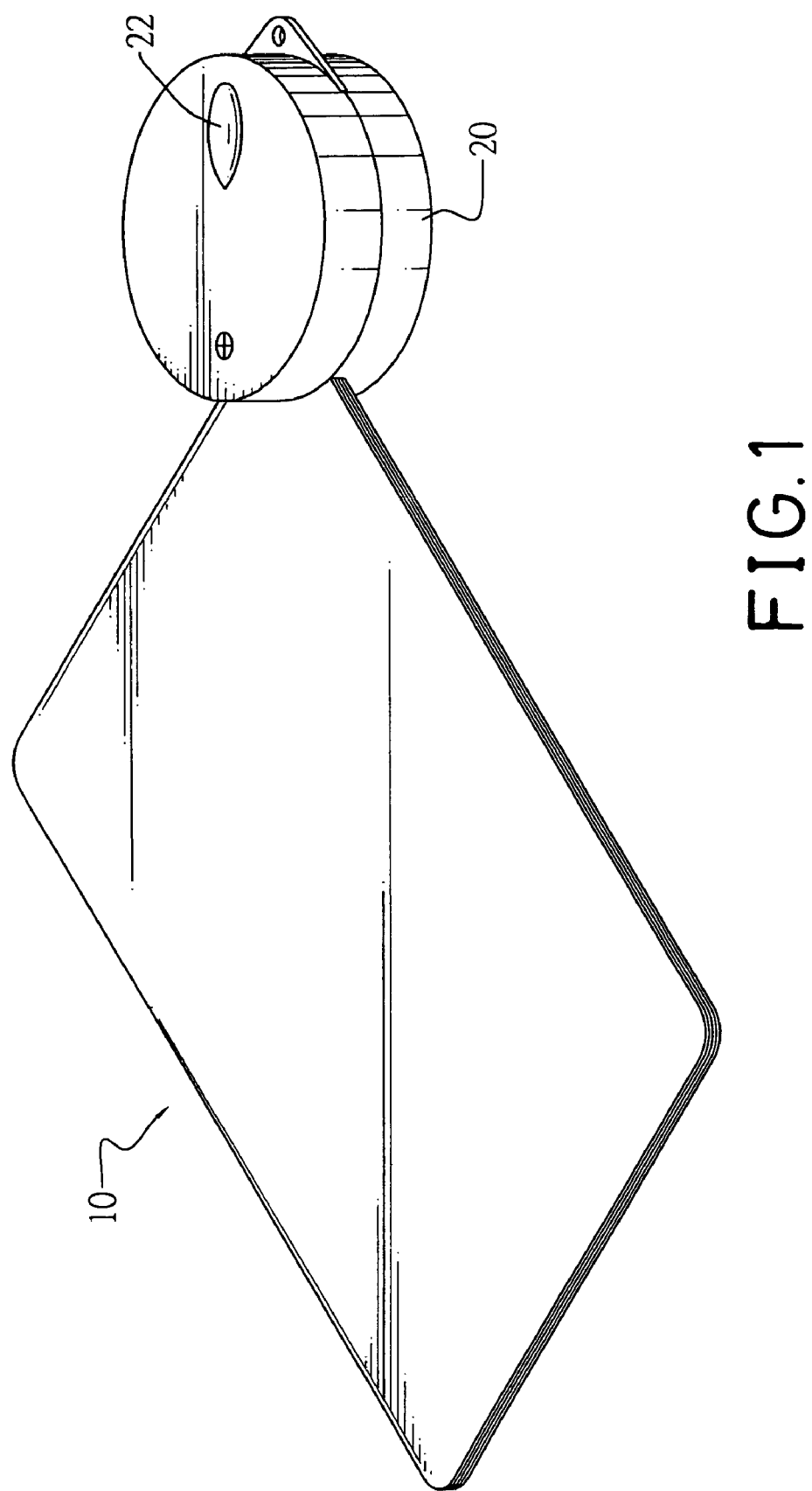
FIG. 1 is a perspective view of a luminescent card device in accordance with the present invention.
Figure 2:
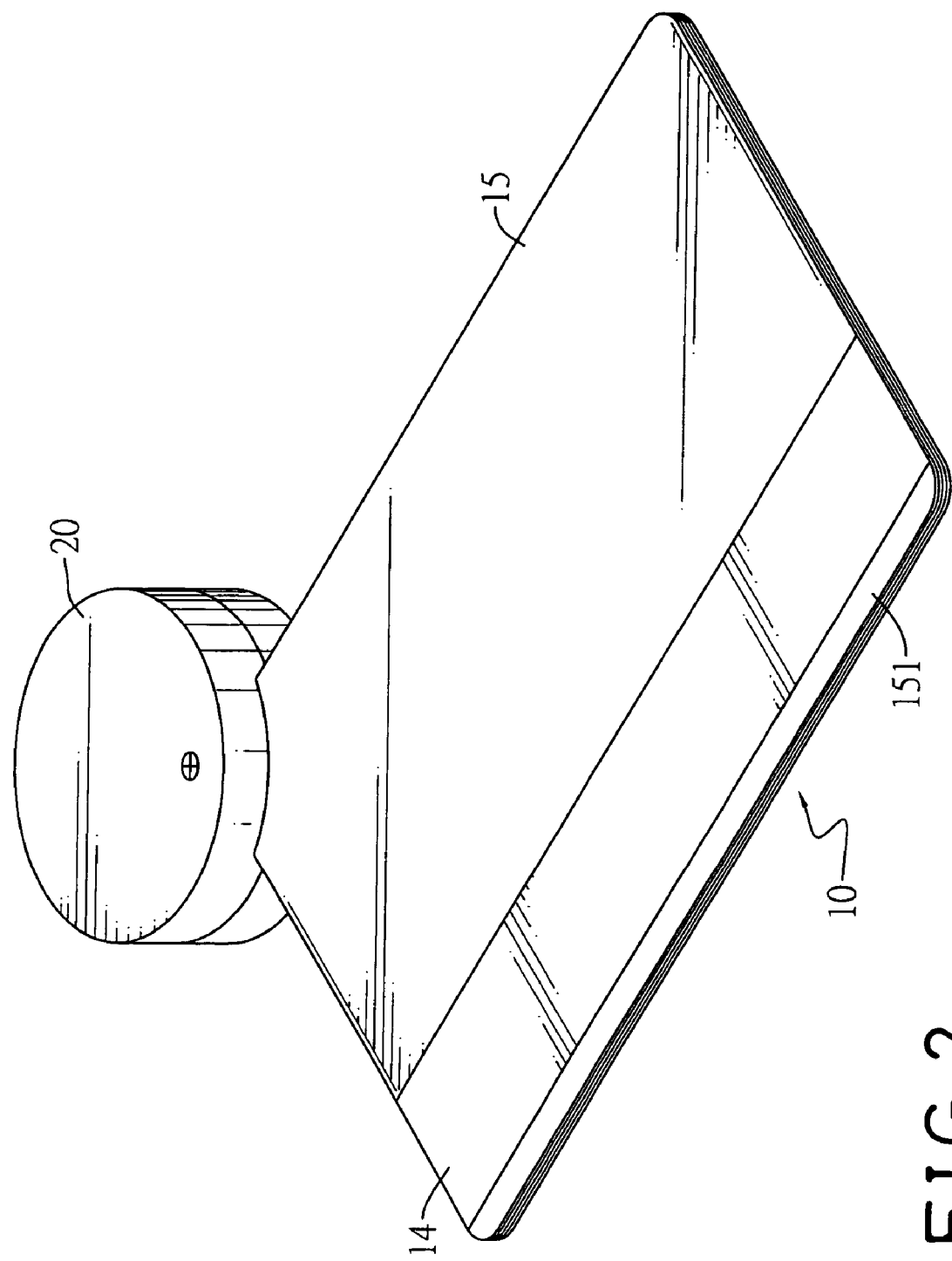
FIG. 2 is a perspective view of another side of the luminescent card device in FIG. 1.

With reference to FIG. 1 and 2, a luminescent card device in accordance 24 with the present invention comprises a luminescent card (10) and an actuator (20).

Figure 3:
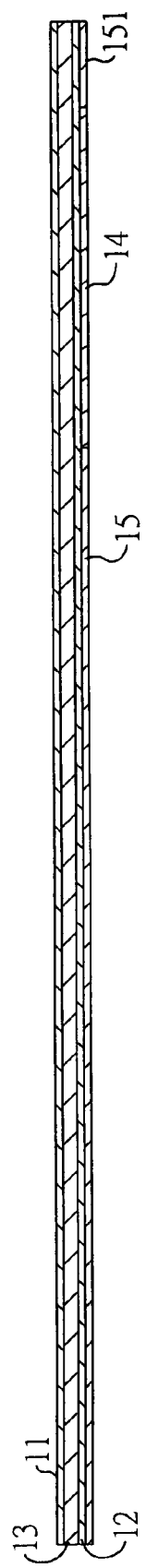
FIG. 3 is a cross sectional side view of the luminescent card in FIG. 1.
Figure 4:
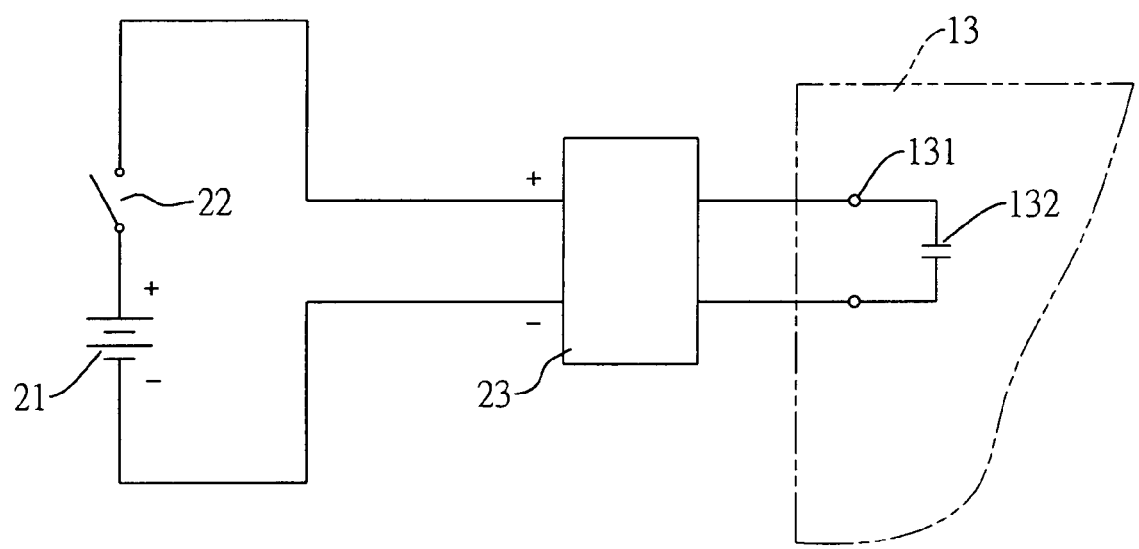
FIG. 4 is a circuit diagram of an actuator and the luminescent card in FIG. 1.
Figure 5:
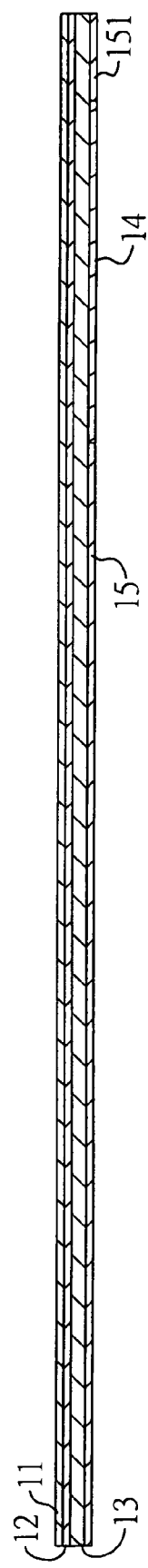
FIG. 5 is a cross sectional side view of a second embodiment of the luminescent card in accordance with the present invention.

With further reference to FIG. 3, 4 and 5, the luminescent card (10) comprises a plastic layer (12), a luminescent layer (13), a memory device (14), a top printed area (11) and multiple bottom printed areas (15, 151) and has a top surface, a bottom surface and four corners. The plastic layer (12) may be transparent or translucent and has a top surface and a bottom surface. The luminescent layer (13) is an electroluminescent material that emits light when subjected to a capacitive field of an alternating current, is attached to the plastic layer (12) and has a top surface, a bottom surface, two surface contacts (131) and an embedded capacitor (132). The top or bottom surface of the luminescent layer (13) may be attached respectively to bottom or top surface of the plastic layer (12). The surface of the luminescent layer (13) not attached to the plastic layer is exposed. The surface contacts (131) are mounted on the exposed surface of the luminescent layer (13). The embedded capacitor (132) is mounted in the electroluminescent material of the luminescent layer (13) and is connected to the surface contacts (131). The memory device (14) is attached to the bottom surface of the luminescent card (10) and may be a magnetic strip (14) or a memory chip. The top printed area (11) is printed on the top surface of the luminescent card (10) and is light permeable. When the surface contacts (131) are on the top surface of the luminescent card (10), the top printed areas (11) are printed around the surface contacts (131). The bottom printed areas (15, 151) are printed on the bottom surface of the luminescent card (10) around the memory device and are light permeable. Information printed on the luminescent card may include bank information, card number, cardholder's photo, cardholder's signature and the like.

The activator (20) is attached to one of the corners of the luminescent card (10) on the top and bottom surface and has a casing, a switch (22), a battery (21) and an inverter (23). The casing has a top, a sidewall, a slot, an inner cavity and a switch opening. The slot is formed in the sidewall, has two sides and is mounted on a corner of the luminescent card (10). The switch opening is formed through the top of the casing. The switch (22) is mounted in the casing, protrudes from the switch opening in the casing and has two leads. The battery (21) is mounted in the casing and has two terminals. One terminal is connected to one lead from the switch (22). The inverter (23) is mounted in the casing, is connected to the other terminal of the battery (21) and the other lead from the switch (22) and has two output terminals. The output terminals are mounted in the casing adjacent to the slot and contact the surface contacts (131) on the luminescent layer (13) when the luminescent card (10) is mounted in the slot. When the switch (22) is closed, an alternating current is generated at the output terminals of the inverter (23). The alternating current from the inverter (23) is applied to the embedded capacitor (132), the embedded capacitor (24) excites the electroluminescent material in the luminescent layer (13), and the luminescent layer (13) emits light.

Furthermore, only a few specific manufacturers make the luminescent layer (13) so criminals cannot possibly counterfeit any luminescent card device. If criminals do manage to counterfeit the luminescent card device, law enforcement agents will be able to trace the criminals through the luminescent layer's (13) manufacturers.

In conclusion, the luminescent card device emits light, and more particularly, the luminescent layer (13) makes counterfeiting the luminescent card device impossible. Issuing banks and the card companies will save money previously lost from counterfeit cards.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A luminescent card device comprising
    a luminescent card having a top surface, a bottom surface and four corners and comprising
        a plastic layer having
            a top surface; and
            a bottom surface;
        a luminescent layer being an electroluminescent material, attached to the plastic layer and having
            a top surface;
            a bottom surface;
            two surface contacts mounted on an exposed surface of the luminescent layer; and
            an embedded capacitor mounted in the electroluminescent material and connected to the surface contacts;
        a memory device mounted on the bottom surface of the luminescent card;
        a top printed area printed on the top surface of the luminescent card and being light permeable; and
        multiple bottom printed areas printed on the bottom surface of the luminescent card around the memory device and being light permeable; and
    an activator attached to one of the corners of the luminescent card device on the top and bottom surface and having
        a casing having
            a top;
            a sidewall;
            a slot formed in the sidewall, having two sides and mounted on a corner of the luminescent card; and
            a switch opening formed through the top of the casing;
        a switch mounted in the casing, protruding from the switch opening in the casing and having two leads;
        a battery mounted in the casing and having two terminals with one terminal connected to one lead from the switch; and
        an inverter mounted in the casing, connected to the other terminal of the battery and the other lead from the switch and having two output terminals mounted in the casing adjacent to the slot and contacting the surface contacts on the luminescent layer when the luminescent card is mounted in the slot.

2. The luminescent card device as claimed in claim 1, wherein the plastic layer is transparent.

3. The luminescent card device as claimed in claim 1, wherein the plastic layer is translucent.

4. The luminescent card device as claimed in claim 1, wherein
    the bottom surface of the luminescent layer is attached to the top surface of the plastic layer; and
    the surface contacts are mounted on the top surface of the luminescent layer.

5. The luminescent card device as claimed in claim 1, wherein
    the top surface of the luminescent layer is attached to the bottom surface of the plastic layer; and
    the surface contacts are mounted on the bottom surface of the luminescent layer.

* * * * *